(12) United States Patent
Garcés et al.

(10) Patent No.: US 9,539,654 B2
(45) Date of Patent: Jan. 10, 2017

(54) MACHINE AND METHOD FOR MACHINING ENDS OF CRANKSHAFTS

(75) Inventors: Jorge Ibarra Garcés, Elgoibar (ES); Ibon Iribarren Aristizabal, Elgoibar (ES)

(73) Assignee: ETXE-TAR, S.A., Elgoibar, Guipuzcoa (ES)

( * ) Notice: Subject to any disclaimer, the term of this patent is extended or adjusted under 35 U.S.C. 154(b) by 473 days.

(21) Appl. No.: 14/126,842

(22) PCT Filed: Jun. 17, 2011

(86) PCT No.: PCT/ES2011/070432
§ 371 (c)(1),
(2), (4) Date: Mar. 19, 2014

(87) PCT Pub. No.: WO2012/172125
PCT Pub. Date: Dec. 20, 2012

(65) Prior Publication Data
US 2015/0078852 A1    Mar. 19, 2015

(51) Int. Cl.
*B23Q 39/02* (2006.01)
*B23C 3/06* (2006.01)
(Continued)

(52) U.S. Cl.
CPC ............... *B23C 3/06* (2013.01); *B23Q 39/026* (2013.01); *B23Q 39/04* (2013.01);
(Continued)

(58) Field of Classification Search
CPC ............. B23C 3/06; B23Q 2039/002; B23Q 2039/006; B23Q 2230/006; B23Q 39/04; B23B 39/22
See application file for complete search history.

(56) References Cited

U.S. PATENT DOCUMENTS

| 6,203,478 B1 * | 3/2001 | Gorrochategui ...... B23B 39/161 408/236 |
| 6,228,007 B1 | 5/2001 | Quak et al. |

(Continued)

FOREIGN PATENT DOCUMENTS

| CN | 201711579 | 1/2011 |
| CN | 102091812 | 6/2011 |
| WO | WO 2009/103825 | 8/2009 |

OTHER PUBLICATIONS

Notification of the First Office Action, Chinese Patent Office, Application No. 201180072372.X, Apr. 29, 2015, 11 pages.
(Continued)

*Primary Examiner* — Daniel Howell
*Assistant Examiner* — Alan Snyder (57) ABSTRACT

The invention relates to a machine comprising a first machining module (1) configured to simultaneously machine at least two crankshafts, a second machining module (2) configured to simultaneously machine at least two crankshafts, and a support structure (3) with at least four crankshaft fixing positions (31, 32, 33, 34) for the machining of such crankshafts. The support structure (3) is located between the machining modules. The fixing positions (31, 32, 33, 34) are arranged in two columns (35, 36) of fixing positions, each of which comprises at least two of the fixing positions (31, 32; 33, 34) located at a different height, and the support structure (3) is rotatably arranged, such that it can perform a rotation of at least 180 degrees.

13 Claims, 5 Drawing Sheets

(51) Int. Cl.
*B23Q 39/04* (2006.01)
*B23Q 39/00* (2006.01)

(52) U.S. Cl.
CPC .. *B23Q 2039/002* (2013.01); *B23Q 2230/006* (2013.01); *Y10T 409/30392* (2015.01); *Y10T 409/30756* (2015.01); *Y10T 409/303752* (2015.01); *Y10T 409/307168* (2015.01); *Y10T 409/309016* (2015.01); *Y10T 483/1795* (2015.01); *Y10T 483/1891* (2015.01)

(56) References Cited

U.S. PATENT DOCUMENTS

| 2011/0005074 | A1  | 1/2011 | Ayestaran Lazcano et al. |
| 2011/0085865 | A1* | 4/2011 | Yoshimoto ............. B23B 49/04 408/1 R |

OTHER PUBLICATIONS

International Search Report, PCT/ES2011/070432, completion date Mar. 1, 2012; 4 pages.

* cited by examiner

MACHINE AND METHOD FOR MACHINING ENDS OF CRANKSHAFTS

TECHNICAL FIELD OF THE INVENTION

The invention is comprised in the technical field of machine tools and, more specifically, it relates to a machine for machining crankshafts, for example, crankshafts for automotive vehicles.

BACKGROUND OF THE INVENTION

The ends of crankshafts for automotive vehicles, for example, for passenger cars, are usually machined in machines specifically designed for performing the corresponding operations. For example, the crankshafts can be arranged in a workstation located between two machining modules (each can be configured to simultaneously machine a plurality of crankshafts, generally using a tool for each crankshaft, for example, using a multi-spindle head), such that a first machining module machines one end of the crankshaft (or one end of several crankshafts) and the other machining module simultaneously machines the other end of the crankshaft (or of the crankshafts).

To achieve a high production rate and an efficient use of the machinery, it is desirable for both machining modules to work with a high performance and with a minimum downtime between operations. WO-A-2009/103825 describes an example of how to achieve the reduction of the downtime between operations in a machine for machining crankshafts.

As described in WO-A-2009/103825, it is usual for crankshafts to have two different ends, a first end which will hereinafter be referred to as "flange end" and a second end which will hereinafter be referred to as "post end". Both ends require different machining operations, whereby it is usual for the machining of one of said ends to require more time than the machining of the opposite end; it is usual for the flange end to require a substantially greater machining time than the post end, as explained in WO-A-2009/103825. In the present document, the terms "flange end" and "post end" must not be interpreted in a limiting manner, as if they refer to a specific design of the crankshafts, but rather they are used in a general manner to distinguish between two ends of a crankshaft which require different machining operations.

The solution in WO-A-2009/103825 is based on the use of two workstations, in one of which the crankshafts are arranged in a reverse manner (i.e., "rotated" 180 degrees) with respect to the crankshafts of the other one. In a described embodiment, the workstations are located between two machining module bedplates or guides, on which respective machining modules move. A first machining module can thus machine the flange ends of the crankshafts of the first workstation, to then move laterally to the second workstation to machine the post ends of the crankshafts in the second workstation. In a reverse manner, the second machining module can start by machining the post ends of the crankshafts in the first workstation, to then move to the second workstation to machine the flange ends of the crankshafts located in said second workstation. Therefore, if the time for machining the flange ends requires a time X and the machining of the post ends requires a time Y (which can many times be substantially less than X, for example, a quarter of X), the first machining module can conclude the machining work in both workstations after an approximate time of X+Y (without counting movement times, etc.), and the second machining module can conclude the machining work in both stations after a time Y+X. In other words, the cycle time can be approximately X+Y (without counting movements, delays due to loading and unloading, etc.), and during this time both machining modules can be in full performance, without any of them having to wait for a substantial time for the other one to finish its machining operation. A rather short cycle time and a good exploitation of the machinery are thus achieved.

Nevertheless, and despite the fact that the machine and method described in WO-A-2009/103825 can work satisfactorily from many points of view, they can have several limitations. For example, it may be difficult to perform the loading and unloading in the two workstations from one and the same loading and unloading point or station. Another possible limitation is that in the event of a breakdown in one of the machining modules, the machine does not allow machining both ends of the crankshafts. Another possible limitation is that it may be difficult to perform certain machining operations, which require a determined working angle between the tool-head and the crankshaft (for example, the machining of the keyway or of lightening holes), without using additional machining modules or tool-head changes.

DESCRIPTION OF THE INVENTION

A first aspect of the invention relates to a machine for machining ends of crankshafts, comprising:

a first machining module configured to simultaneously machine at least two crankshafts (i.e., the first module can comprise, for example, two spindles or a multi-spindle head with respective tools for simultaneously machining two or more crankshafts or, more specifically, an end of each of said crankshafts);

a second machining module configured to simultaneously machine at least two crankshafts (i.e., the second module can also comprise, for example, two spindles or a multi-spindle head with respective tools for simultaneously machining two or more crankshafts or, more specifically, an end of each of said crankshafts; the first and the second machining module can be identical and arranged facing one another); and a support structure for supporting crankshafts, said support structure comprising at least four crankshaft fixing positions for the machining of such crankshafts, said support structure being located between the first machining module and the second machining module, such that the first machining module can machine a first end of a plurality of said crankshafts at the same time as the second machining module machines a second end of a plurality of said crankshafts (this does not mean that both modules are always working on the same crankshafts; given that one of them can be working on a post end and the other one on a flange end, one can finish before the other one and then start machining other crankshafts, in a manner more or less similar to what is done in the machine described in WO-A-2009/103825).

According to the invention, said at least four fixing positions are arranged in two columns of fixing positions, each of which comprises at least two of the fixing positions located at a different height, for placing the crankshafts to be machined in two columns, each of which comprises at least two crankshafts arranged at a different height. Thus, each machining module can first machine an end of each crankshaft in a first one of said columns and then an end of each crankshaft of the other column.

Furthermore, according to the invention, said support structure is rotatably arranged, such that it can perform a rotation of at least 180 degrees.

Several effects can thus be achieved.

One effect is that in the event that one of said machining modules stops working, the other one can machine both ends of each crankshaft, first machining one end and then, after a rotation of 180 degrees of the support structure, also machining the other end of the crankshaft.

Another advantage is that by means of rotations of less than 180 degrees, for example, of 20-70 degrees (for example, of 30, 45 or 60 degrees) or of (approximately) 90 degrees, machining operations which were not possible, or which would have been difficult, can be performed in the initial position. This increases the possibilities of performing special or complex machining operations without needing to have additional machining heads and/or without performing tool-head changes.

Another advantage, compared with a machine such as the one described in WO-A-2009/103825, is that all the crankshafts can be loaded in, and unloaded from, the support structure in a single loading and unloading station by means of a rotation of 180 degrees of the support structure, by means of which both of the two columns of crankshafts can be selectively placed in the loading and unloading station or position. This can be advantageous in many cases.

The support structure can be configured such that in one of the columns of fixing positions, the crankshafts to be machined are arranged with flange ends directed towards the first machining module and with post ends directed towards the second machining module, at the same time as in the other column the crankshafts to be machined are arranged with post ends directed towards the first machining module and with flange ends directed towards the second machining module, for example, when the support structure is in a first working position, i.e., in a "non-rotated" position. In other words, it is possible to arrange the crankshafts of one of said columns reversely to those of the other column, whereby the optimization of the cycle time and the exploitation of the machining machinery are achieved; in a manner similar to what occurs in WO-A-2009/103825, the cycle time (without counting additional time necessary for loading/unloading and movement times) can substantially reach the time required for machining the flange end, plus the time required for machining the post end. This time can be substantially less than the time which would have been necessary for successively machining two flange ends.

The machine can further comprise a first guide and a second guide, the first machining module being arranged to move laterally guided by said first guide and the second machining module being arranged to move laterally guided by said second guide, such that each one of said first machining module and said second machining module can move laterally between a working position for machining crankshafts in a first one of said columns, and another working position for machining crankshafts in another one of said columns, without the need for the support structure to rotate. Thus, when a working module finishes machining the flange ends of the crankshafts arranged in one of said columns, it can move laterally, towards the other column, to machine the post ends of the crankshafts located in said other column, and vice versa. A short cycle time can thus be achieved. The term "guide" must be understood generically, encompassing any structure which serves to guide the corresponding machining module in its lateral movement.

The machining modules or at least the tools or tool-head which they incorporate can be movable in three dimensions, i.e., not only laterally (for example, according to an axis X) but also forwards and backwards (for example, according to an axis Z) and in height (for example, according to an axis Y).

Each machining module can comprise a plurality of vertically distributed tools (or spindles, or spindle heads) for allowing the simultaneous machining of a plurality of crankshafts which are vertically distributed, i.e., located at a different height in the corresponding column.

The support structure can be configured to selectively adopt a first working position and a second working position, said second working position being rotated an angle of approximately 90 degrees with respect to said first working position.

Alternatively or additionally, the support structure can be configured to selectively adopt a (or said) first working position and a third working position, said third working position being rotated an angle of between 20 and 70 degrees with respect to said first working position.

Thus, by rotating the support structure, machinings from different working angles can be achieved, which increases the flexibility of the machine and reduces the need for tool-head changes and/or the use of additional machining modules. The machine can comprise a control unit programmed to rotate the support structure between the different working positions, according to a programmed work sequence, for example, to perform machinings of a keyway in the post end and/or lightening holes.

The support structure can be configured to rotate about a vertical axis.

A second aspect of the invention relates to a method for machining crankshafts with a machine as has been described above. The method comprises the steps of:

placing crankshafts to be machined in the fixing positions of the support structure;

machining, with the first machining module, flange ends of a first part of said crankshafts and post ends of a second part of said crankshafts;

machining, with the second machining module, flange ends of said second part of said crankshafts and post ends of said first part of said crankshafts; and unloading machined crankshafts from the support structure.

The method can further comprise the step of performing a rotation of 180 degrees between an unloading from the support structure of said first part of the crankshafts and of said second part of the crankshafts. In other words, one and the same workstation can be used to unload all the crankshafts; the same applies to the loading of crankshafts to be machined.

The method can also comprise the step of performing, with the support structure, at least one rotation of no more than 90 degrees between a first machining phase and a second machining phase.

For example, said rotation can be of 90 degrees. The first machining phase can be a main machining phase and the second machining phase can, for example, correspond to the machining of a keyway in the post end of the crankshafts. In this case, a rotation of 90 degrees can many times be suitable.

The rotation can also be a rotation of between 20 and 70 degrees. The first machining phase can be a main machining phase and the second machining phase can, for example, correspond to the machining of lightening holes. In this case, a rotation of between 20 and 70 degrees, for example, of about 50 or 60 degrees, can be suitable.

DESCRIPTION OF THE DRAWINGS

To complement the description and for the purpose of aiding to better understand the features of the invention according to a preferred practical embodiment thereof, a set of figures is attached as an integral part of the description, in which the following has been depicted with an illustrative and non-limiting character.

PREFERRED EMBODIMENT OF THE INVENTION

Figure 1:
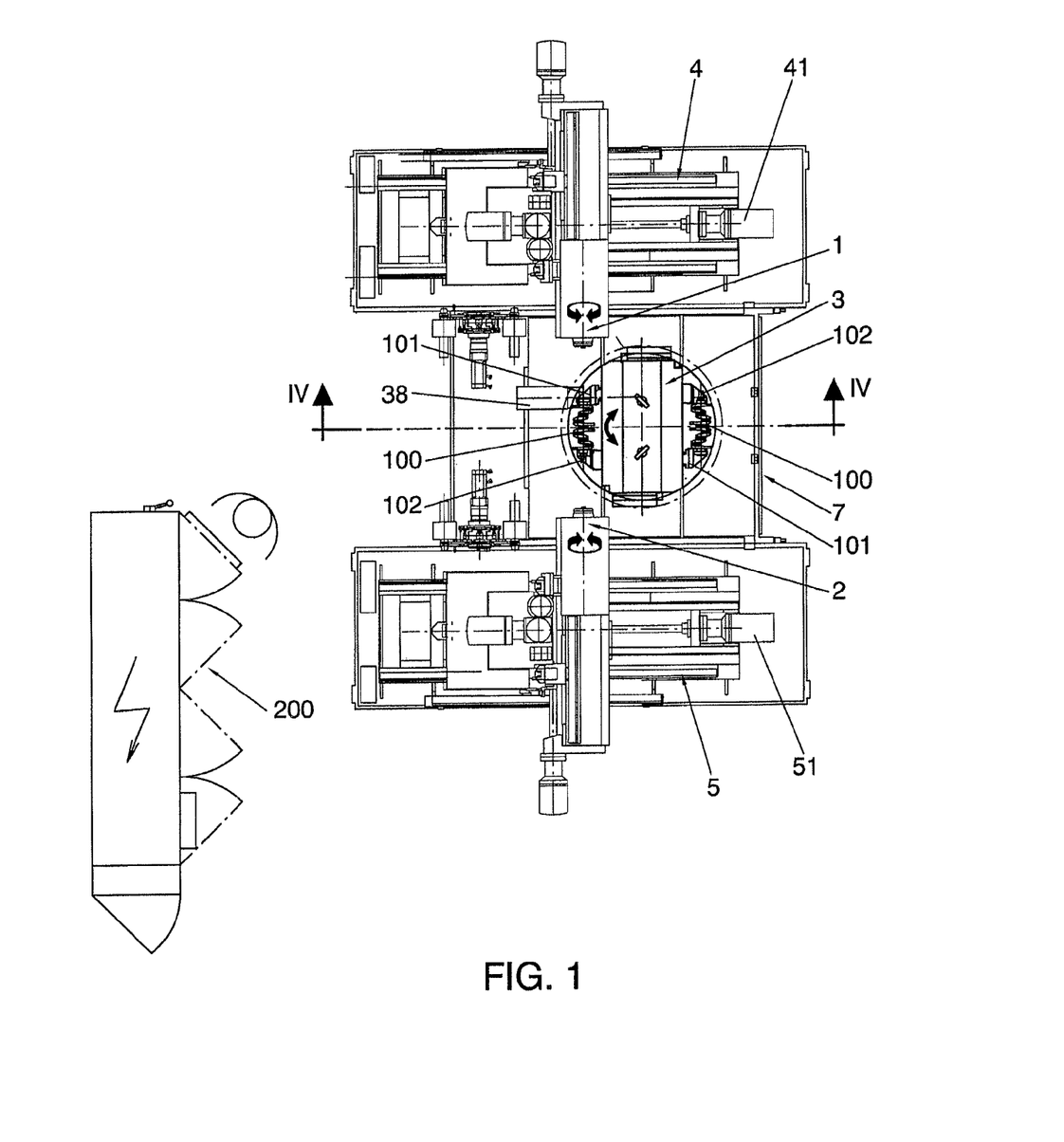
FIGS. 1-3 shows schematic plan views of a machine according to a possible embodiment of the invention.
Figure 2:
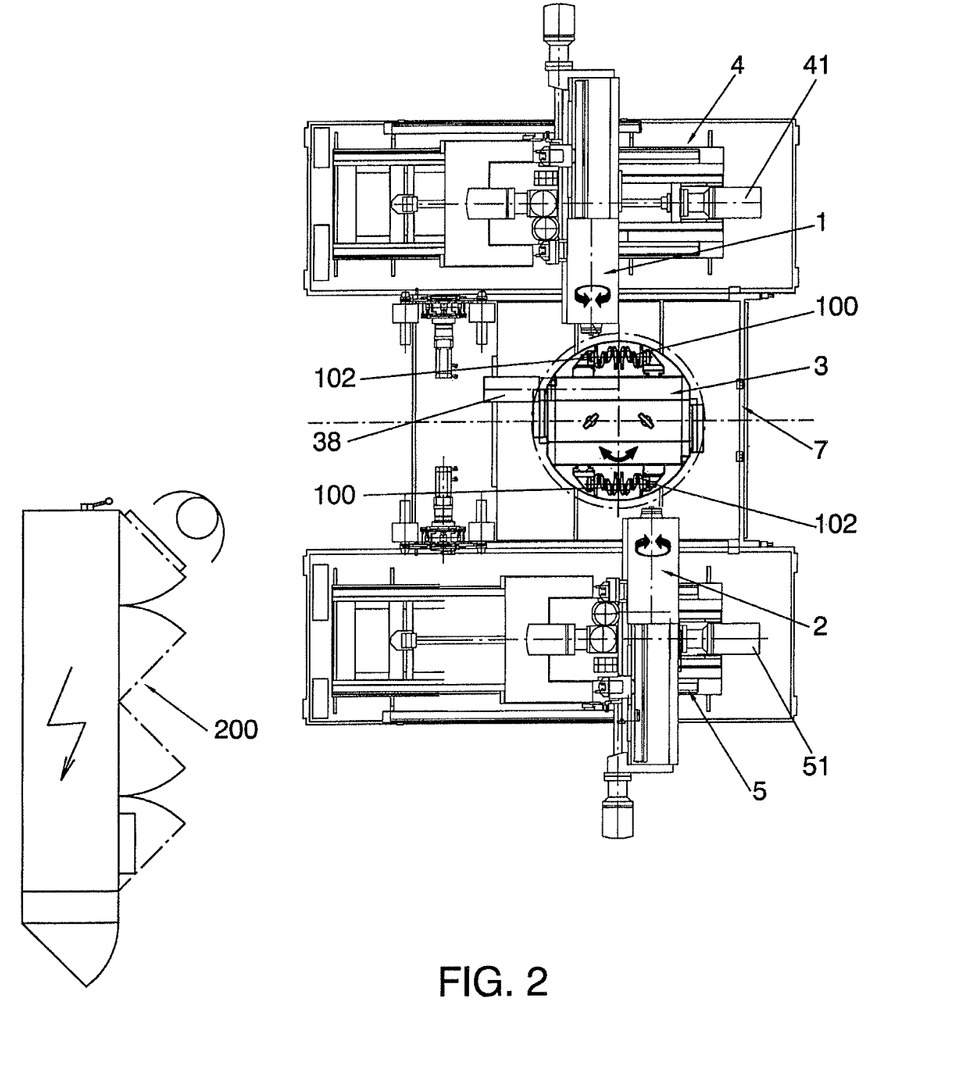
Figure 3:
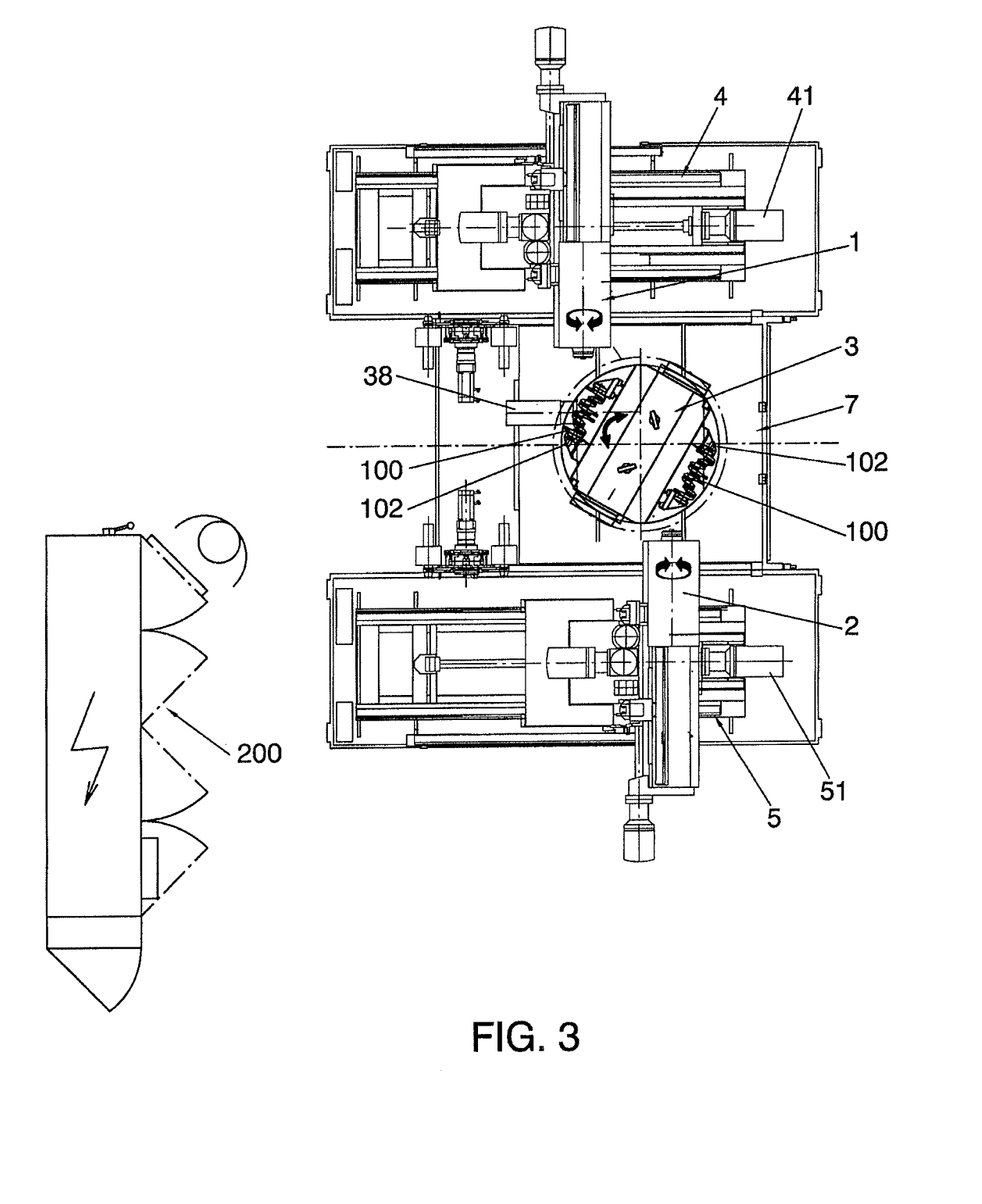

FIGS. 1-3 show a possible embodiment of the machine of the invention, with a first machining module 1 and a second machining module 2, controlled by a control system including a computer 200 (schematically illustrated in FIGS. 1-3) and arranged to move laterally along a first guide 4 and a second guide 5, respectively, driven by driving means 41 and 51, respectively. The guides can include guiding rails, etc., as is conventional. These elements can be conventional and do not require further explanations.

On the other hand, the machine includes a support structure 3 in the form of a tower rotating about a vertical axis, driven by driving means 38 which can be conventional and which can be controlled from the computer 200. In FIGS. 1-3 it can be observed, from above, how the crankshafts 100 are located in two columns (such that only the upper crankshaft of each column is seen). Each column can comprise two crankshafts located at a different height.

Figure 4:
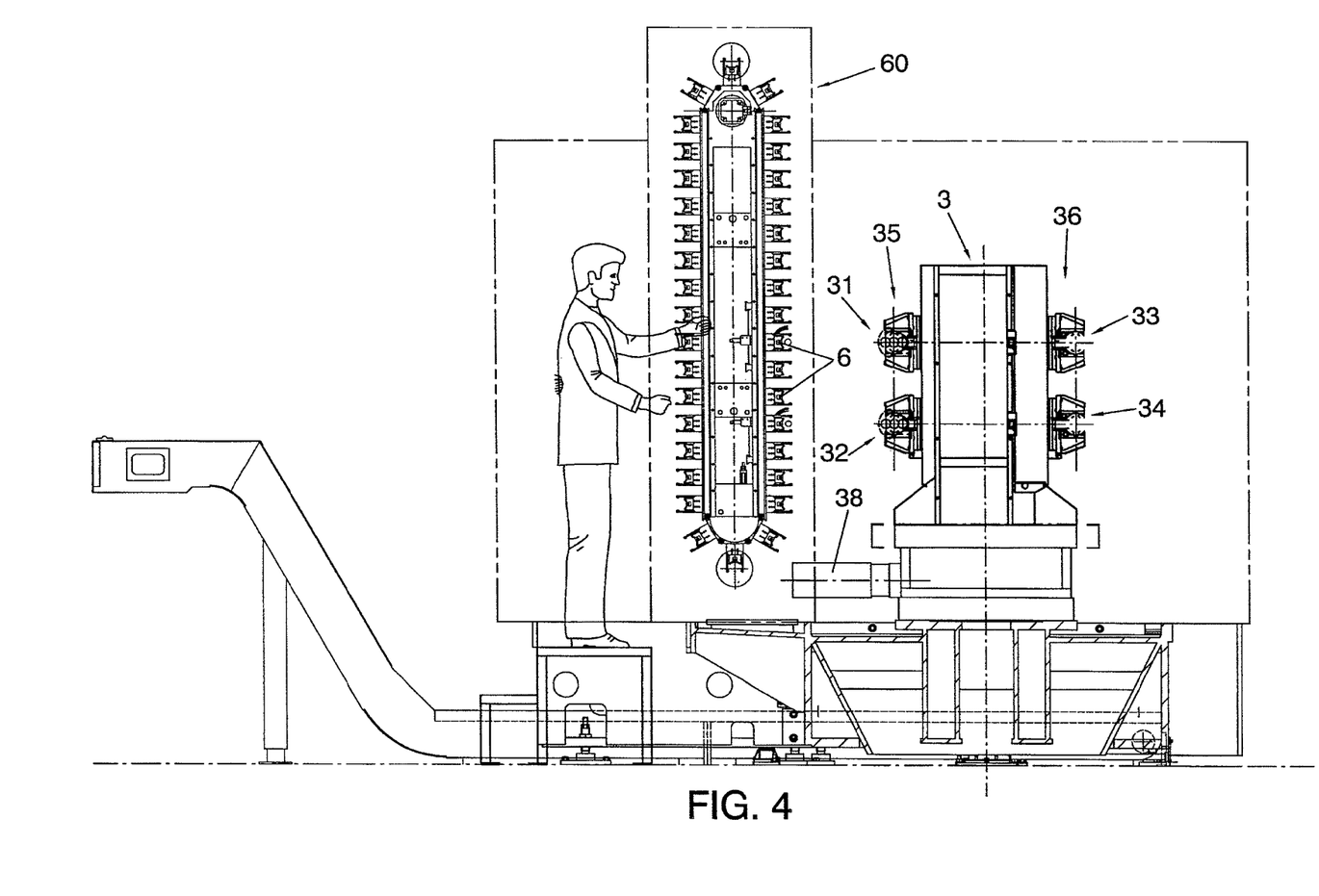
FIG. 4 shows an elevational view from section "IV" indicated in FIG. 1.

In FIG. 4, which is an elevational view according to section IV of FIG. 1, it can be observed how the support structure 3 comprises fixing means (which can be conventional) which define four fixing positions 31, 32, 33 and 34, distributed in said two columns 35 and 36; i.e., the first column 35 comprise the fixing positions 31 and 32 for fixing two crankshafts, one on top of the other, and the second column 36 comprises the fixing positions 33 and 34, also configured to fix two crankshafts, one on top of the other. In this case, each of the machining modules 1 and 2 comprise at least one spindle configured to drive two tools, located at a different height such that one tool will act on the crankshaft located in one of said fixing positions, and the other tool will act on the other crankshaft. A tool storage 60 can also be schematically observed in FIG. 4, which tool storage includes tools 6 which can be coupled to the machining modules, according to the specific tasks to be performed, for example, according to the type of crankshaft which is to be machined.

Returning to FIG. 1, this figure shows the machine in a first working position, in which the crankshafts have an orientation in which they extend in a manner substantially perpendicular to the guides 4 and 5, such that when the machining modules move laterally along the guides, they can selectively interact with the crankshafts located in one of the columns 35 and 36 or with the crankshafts located in the other one of the columns. In this working position, most of the machining operations can be performed.

As has been schematically illustrated, in one of the columns the crankshafts 100 are arranged with the flange end 101 directed towards the first machining module 1 and with the post end 102 directed towards the second machining module 2, whereas in the other column, the crankshafts have the flange ends 101 directed towards the second machining module 2 and the post end 102 directed towards the first machining module 1.

Therefore, in operation, and starting from the situation observed in FIG. 1, the first machining module 1 can start machining the flange end 101 of one of the columns of crankshafts and the second machining module 2 can start machining the post end 102 of the same crankshafts. Since the machining of the post end 102 entails less time than the machining of the flange end 101, the second machining module 2 finishes machining the post end 102 before the first machining module 1 finishes machining the flange end 101. As soon as the second machining module 2 finishes machining the post end 102 of the crankshafts, it moves laterally in order to be placed facing the other column of crankshafts, where it starts machining the flange ends 101 of the crankshafts there secured. When the first machining module finishes machining the flange ends 101 of the crankshafts of the first column, it also passes to the second column and starts machining the post ends of the crankshafts there located. Given that both machining modules machine both flanges and posts, the work should conclude at the same time. Then, in the loading and unloading station 7, the machined crankshafts of one of the columns can be unloaded and new crankshafts to be machined can be loaded, in order to then perform a rotation of 180 degrees of the support structure 3, to unload the remaining machined crankshafts and load new crankshafts to be machined.

Logically, this is only an example of how the machine can operate.

Although many machining operations can be performed in the first working position illustrated in FIG. 1, there may be other operations which are difficult to perform in this position, without performing a tool-head change in the machining modules (which could slow down the cycle time) or without using additional machining modules.

Figure 5:
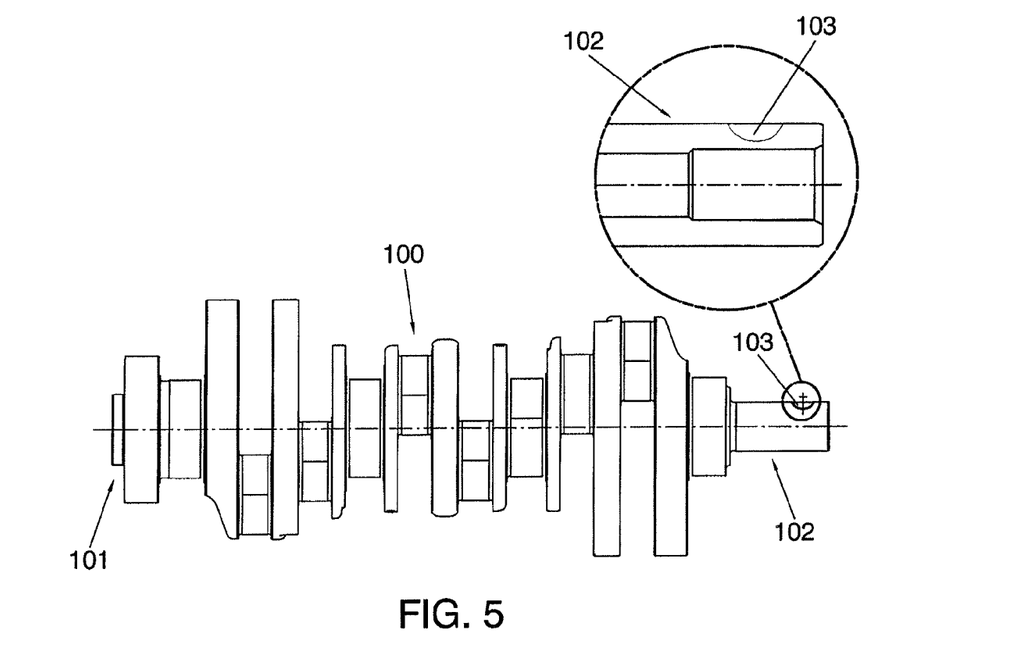
FIGS. 5 and 6 show examples of crankshafts requiring machining operations which can be easily performed with a machine according to the invention.
Figure 6:
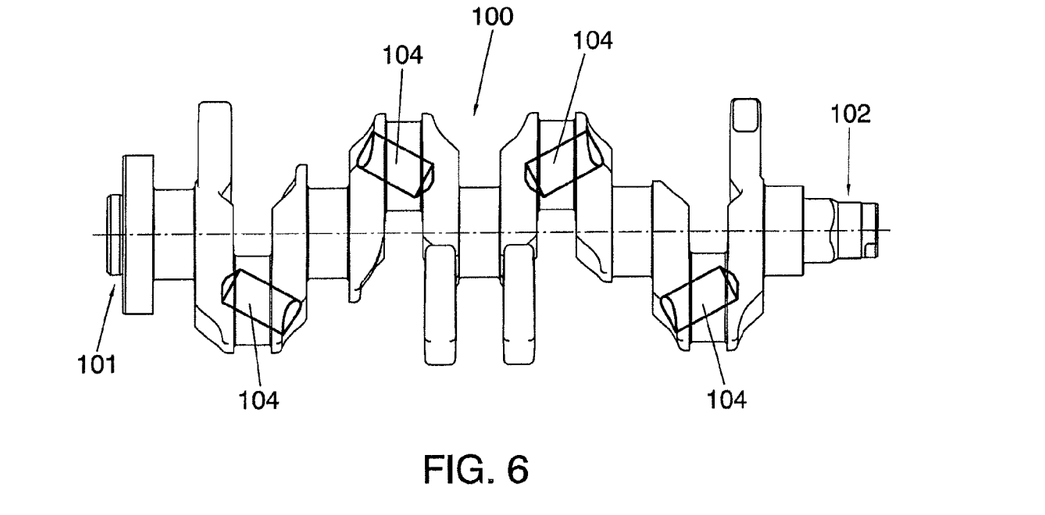

For example, in some crankshafts it may be necessary to machine a keyway 103 in the post end 102, as illustrated in FIG. 5. This operation may require high precision. To make this keyway without the need for additional machining modules and without needing to change the tool-head in the first machining module and the second machining module, it may be necessary or practical to change the orientation of the crankshafts with respect to the first working position, illustrated in FIG. 1. To that end, the support structure can be rotated 90 degrees with respect to said first working position, reaching a second working position which is illustrated in FIG. 2, in which the keyway can be machined with the first machining module and the second machining module (one acting on the crankshafts in one of the columns and the other one on the crankshafts in the other one of the columns, as can be seen in FIG. 2.)

On the other hand, in some crankshafts it may be necessary or desirable to make holes 104 in the crankpin area to lighten the crankshaft. This operation can also be difficult to perform in the first working position. With the machine of the invention, a rotation of, for example, 50-70 degrees can be performed from the first working position, reaching a third working position which is illustrated in FIG. 3. In this position, the holes 104 can be made using the first machining module 1 for one of the columns of crankshafts and the second machining module for making the holes 104 in the crankshafts of the other column.

These are only examples of operations which can be performed with a machine according to the present invention.

LIST OF REFERENCE NUMBERS 1, 2: machining modules
3: support structure 4, 5: guides for the lateral movement of the machining modules
6: machining tools
7: loading and unloading station
31, 32, 33, 34: crankshaft fixing positions
35, 36 columns of crankshaft fixing positions
38 drive of the support structure
41, 51 driving means for the lateral movement of the machining modules
60 tool storage
100 crankshaft
101 flange end
102 post end
103 keyway
104 lightening holes
200 control computer In this text, the word "comprises" and its variants (such as "comprising", etc.) must not be interpreted in an exclusionary manner, i.e., they do not exclude the possibility that what is described include other elements, steps etc.

On the other hand, the invention is not limited to the specific embodiments which have been described, but rather it also encompasses, for example, the variants which can be performed by a person having ordinary skill in the art (for example, in relation to the choice of materials, dimensions, components, configuration, etc.), within what is inferred from the claims.

The invention claimed is:

1. Machine for machining ends of crankshafts, comprising:
    a first machining module (1) configured to simultaneously machine at least two crankshafts;
    a second machining module (2) configured to simultaneously machine at least two crankshafts;
    a support structure (3) for supporting crankshafts, said support structure comprising at least four crankshaft fixing positions (31, 32, 33, 34) for the machining of such crankshafts, said support structure (3) being located between the first machining module and the second machining module, such that the first machining module can machine a first end of a plurality of said crankshafts at the same time as the second machining module machines a second end of the plurality of said crankshafts;
    characterized in that
    said at least four fixing positions (31, 32, 33, 34) are arranged in two columns (35, 36) of fixing positions, each of which comprises at least two of the fixing positions (31, 32; 33, 34) located at a different height, for placing the crankshafts to be machined in two columns, each of which comprises at least two crankshafts arranged at a different height; and in that
    said support structure (3) is rotatably arranged, such that it can perform a rotation of at least 180 degrees.

2. Machine according to claim 1, wherein the support structure is configured such that in one of the columns of fixing positions, the crankshafts to be machined are arranged with flange ends (101) directed towards the first machining module (1) and with post ends (102) directed towards the second machining module (2), at the same time as in the other column the crankshafts to be machined are arranged with post ends (102) directed towards the first machining module (1) and with flange ends (101) directed towards the second machining module (2).

3. Machine according to claim 1, further comprising a first guide (4) and a second guide (5), the first machining module (1) being arranged to move laterally guided by said first guide (4) and the second machining module (2) being arranged to move laterally guided by said second guide (5), such that each one of said first machining module (1) and said second machining module (2) can move laterally between a working position for machining crankshafts in a first one of said columns (35, 36) and another working position for machining crankshafts in another one of said columns (36, 35).

4. Machine according to claim 1, wherein each machining module comprises a plurality of vertically distributed tools (6) for allowing the simultaneous machining of a plurality of vertically distributed crankshafts.

5. Machine according to claim 1, wherein the support structure (3) is configured to selectively adopt a first working position (FIG. 1) and a second working position, said second working position (FIG. 2) being rotated an angle of approximately 90 degrees with respect to said first working position.

6. Machine according to claim 1, wherein the support structure (3) is configured to selectively adopt a first working position (FIG. 1) and a third working position (FIG. 3), said third working position being rotated an angle of between 20 and 70 degrees with respect to said first working position.

7. Machine according to claim 5, wherein the support structure is configured to adopt a third working position (FIG. 3), said third working position being rotated an angle of between 20 and 70 degrees with respect to said first working position.

8. Machine according to claim 1, wherein the support structure (3) is configured to rotate about a vertical axis.

9. Method for machining crankshafts with a machine according to claim 1, comprising the steps of:
    placing crankshafts (100) to be machined in the fixing positions (31, 32, 33, 34) of the support structure (3);
    machining, with the first machining module (1), flange ends (101) of a first part of said crankshafts and post ends (102) of a second part of said crankshafts;
    machining, with the second machining module (2), flange ends (101) of said second part of said crankshafts and post ends (102) of said first part of said crankshafts; and
    unloading machined crankshafts (100) from the support structure (3).

10. Method according to claim 9, additionally comprising the step of performing a rotation of 180 degrees between an unloading from the support structure (3) of said first part of the crankshafts and of said second part of the crankshafts.

11. Method according to claim 9, comprising the step of performing, with the support structure (3), at least one rotation of no more than 90 degrees between a first machining phase and a second machining phase.

12. Method according to claim 11, wherein said rotation is a rotation of 90 degrees.

13. Method according to claim 11, wherein said rotation is a rotation of between 20 and 70 degrees.

* * * * *